Patented Apr. 2, 1946

2,397,612

UNITED STATES PATENT OFFICE 2,397,612

PLASTIC COMPOSITIONS AND APPLICATIONS THEREOF

William H. Lycan, Milwaukee, Wis., assignor to Pittsburgh Plate Glass Company, Allegheny County, Pa., a corporation of Pennsylvania No Drawing. Application January 23, 1939, Serial No. 252,400

3 Claims. (Cl. 260—36)

The present invention relates to plastic compositions and notably to plastic compositions suitable for use as reinforcing layers between sheets of glass in safety glass.

One object of the invention is to provide a plastic composition suitable for use as an interlayer in safety glass, which is clear, transparent, tough, and firmly adherent to the glass surfaces over a wide range of ordinary atmospheric temperatures.

A second object of the invention is to provide a composition of the foregoing type, which is stable in color and other characteristics upon aging and exposure to light and heat.

A third object of the invention is to provide a composition which is resistant to the action of moisture.

These and other objects will be apparent from consideration of the following specification and the appended claims.

The lamination of plates or sheets of glass with a layer or layers of plastic material, in order to provide a shatter-proof glazing material for automobiles, is well known.

For years nitrocellulose was commonly employed as the plastic. However, it was characterized by many objectionable features. For example, it was not self-adherent to the glass and required the use of a cement coating in order to obtain satisfactory bonding to the glass. Moreover, it tended to discolor to an objectionable degree upon aging under light. Its strength was also only fair and at low temperatures such as are encountered in winter in many parts of the country it became so brittle as to impart but little resistance to shattering to the glass in which it was incorporated.

Recently the use of vinyl acetals (polymerization products of vinyl acetate and an aldehyde such as butyraldehyde) as reinforcements in safety glass has been suggested.

The preparation of a resin suitable for the purpose has been described in Fix Patent 2,045,130 and in Patent 2,120,628, to Ernest W. Reid. The resin is greatly superior to nitrocellulose as a plastic layer in safety glass, but before it can be formed into sheets suitable for such use it must be modified by incorporation with a considerable amount of a plasticizer.

The provision of a plasticized mass suitable for use as the interlayer in safety glass involves much difficulty. The plasticizer and the resin must not only be capable of blending to provide a body which is non-brittle, but the body must have many other essential properties. For example, it must be of great clarity, because when it is applied to glass any off color would immediately become objectionably apparent. Moreover, it must maintain its clarity when the plastic is subjected to heat during lamination and upon subsequent aging and exposure to light. It must not form bubbles during service and it is desirable that it be resistant to moisture in order that it will remain adherent to the glass at the edges of the finished plate and in order to prevent formation of haze during service. The plasticizer must not sweat out of the plasticized mass. It must also be strongly adherent to the glass and retain its strength and plasticity both at reasonably high and at reasonably low temperatures (e. g. within the range of 0° to 120° F.).

Of all the innumerable compositions of vinyl acetal and plasticizers that have heretofore been suggested as interlayers for safety glass, only a triflingly small percentage can meet the exacting requirement imposed. As a result of years of research, compositions of vinyl acetal and the relatively pure hexoic acid esters of di and triethylene glycol have heretofore been selected as outstandingly successful as reinforcements in safety glass. Almost all others have heretofore ben found to be impracticable. The use of this plastic composition as an intermediate for safety glass is disclosed in Patent 2,045,130 to Earl L. Fix, previously mentioned.

The present invention involves as a feature the discovery that plastic compositions comprising vinyl acetal homogeneously blended with an ester of a glycol and certain mixtures of acids obtained by oxidation of petroleum hydrocarbons are of outstanding merit as interlayers for safety glass.

In the preparation of an ester for compounding with the vinyl acetal, suitable glycols comprise ethylene glycol, trimethylene glycol and the glycolic ethers, such as diethylene glycol, triethylene glycol, tetra ethylene glycol and the like herein included broadly as poly ethylene glycols.

The acids employed are obtained as mixtures from open chain petroleum hydrocarbons, e. g. a kerosene fraction of 45° Bé. from Pennsylvania petroleum by air oxidation under pressure in liquid phase and in the presence of suitable catalyst. Processes of preparing these acids are disclosed in Burwell Patents 1,791,711 and 1,895,374. Thees acids are largely of branched chain molecular structure and may be cut by distillation into fractions having differing boiling points and therefore different molecular weights. They may be separated from the non-acid constituents admixed herewith by treating them with alkali and then separating the non-acid constituents from the resultant salts. Free acids are liberated by treating the salts with mineral acid. One fraction which is suitable for esterification with glycols and subsequent incorporation with vinyl acetal probably comprises a blend of several branched chain acids and boils within a range of about 55 to 130° C. under a pressure of 1 m. m. of mercury. Fractions boiling either at higher or lower pressures may also be employed. Limited fractions boiling between these limits and mixtures of various fractions of course are contemplated.

The size of the molecules of the acids probably varies over a considerable range, but for purposes of the present invention, it is deemed that acid mixtures of an average of about eight carbon atoms per molecule are most satisfactory.

These acids are esterified with the dihydroxy compound by heating them together in the presence or absence of an acid catalyst until the theoretical volume of water has been removed.

The preparation of esters from various acid fractions is described in my co-pending application Serial No. 191,571, filed February 19, 1938.

Vinyl acetal resins suitable for compounding with the esters are disclosed in the Fix patent and Reid patent already mentioned. The acetal obtained by 66% acetalization of poly vinyl acetate with isobutyr aldehyde is satisfactory for the purpose. However, any of the other acetal resins disclosed in the patents may be employed.

The esters may constitute about 25 to 45% (e. g. 31 or 32%) of the composition. Various methods may be employed in the incorporation of the ingredients of the composition. For example, the resin may be dissolved in a solvent and then incorporated with the ester. Subsequently the solution is admixed with water to effect precipitation and is washed, dried and sheeted.

The plasticizer may also be milled into vinyl acetal containing about 8% of water. Various methods of this type are disclosed in Haux Patent 2,046,378, and in Groff Patent 2,120,934. The plasticized resins, while still containing some water, may be sheeted by the methods disclosed in Groff Patent 2,120,935 or Haux Patent 2,062,750.

The sheets, after excess water and solvent have been evaporated, are assembled without an intermediate cement between two plates of glass and the assembly is rolled in order to effect preliminary adhesion and to force out bubbles of air. The assembly is placed in an autoclave and subjected to the direct pressure of about 150 lbs. per square inch in a medium such as ethylene glycol at a temperature of about 130° C. for about 5 minutes to effect direct adherence of the plastic to the glass. The medium is then cooled to about 75° C. and the pressure is released. Finally it is cooled sufficiently to admit of handling of the glass and the latter is removed from the autoclave.

For purposes of testing the value of the plastic compositions herein disclosed as interlayers in safety glass, vinyl acetal containing about 31% of triglycol ester of an acid fraction containing an average of eight carbon atoms per molecule was formed into sheets about 0.015 inch thick and laminated between plates of glass twelve inches square, each plate being about 7/64 inch thick. These samples were then subjected to the impact of a freely falling steel ball of ½ pound weight and the height in feet of fall required to produce failure determined. The results of these tests at 0° F.–70° F. and 120° F. are recorded as follows:

| 0° F. | 70° F. | 120° F. |
|---|---|---|
| 28 | 50 | 17 |

These values are excellent and show that the plastic containing the esters retains its strength, toughness, plasticity and adhesion over a wide range of temperatures. The samples were clear and resistant to discoloration by ultraviolet light. They also resisted moisture penetration.

It will be apparent that diglycol, tetra glycol and polyglycols in general can be substituted for triglycol, and that various of the possible acid fractions obtained by liquid phase oxidation of petroleum hydrocarbons may be employed in the preparation of esters suitable for use in practicing the present invention.

Various esters may be blended with each other in any desired ratio. Likewise, it is possible to blend the esters herein disclosed with many other esters, such as di or triglycol dihexoate or dibutyl phthalate in any and all proportions.

The forms of the invention herein disclosed are to be regarded as examples. Numerous modifications can be made therein without departure from the spirit of the invention or the scope of the following claims.

What I claim is:

1. As a new article of manufacture, a plastic interlayer for interposition between a pair of sheets of glass to form safety glass, said interlayer comprising a flexible sheet of polyvinyl acetal resin plasticized with about 25 to 45 percent of an ester of (A) a dihydroxy ethyl ether alcohol containing 2 to 3 ethyl groups and (B) a mixture of branched chain acids obtained by air oxidation of an open-chain petroleum hydrocarbon of about 45° Bé., the acids of said mixture constituting the fraction containing an average of about 8 carbon atoms per molecule and boiling within a range of about 55 to 130° C. at 1 mm. pressure, said sheet having a capacity adhering directly to glass under heat and pressure to provide a strong and permanent bond within a range of temperature extending substantially above and below normal atmospheric temperature.

2. As a new article of manufacture, a plastic interlayer for interposition between a pair of sheets of glass to form safety glass, said interlayer comprising a flexible sheet of polyvinyl acetal resin plasticized with about 25 to 45 percent of an ester of (A) triethylene glycol and (B) a mixture of branched chain acids obtained by air oxidation of an open-chain Pennsylvania petroleum hydrocarbon of about 45° Bé., the acids of said mixture containing an average of 8 carbon atoms per molecule and boiling within a range of about 55 to 130° C. at 1 mm. pressure, said sheet having a capacity of adhering directly to glass under heat and pressure to provide a strong and permanent bond in a range of temperatures extending substantially above and below normal atmospheric temperature.

3. As a new article of manufacture, a plastic interlayer for interposition between a pair of sheets of glass to form safety glass, said interlayer comprising a flexible sheet of polyvinyl butyral resin plasticized with about 25 to 45 percent of an ester of (A) triethylene glycol and (B) a mixture of branched chain acids obtained by air oxidation of an open-chain Pennsylvania petroleum hydrocarbon of about 45° Bé., the acids of said mixture containing an average of about 8 carbon atoms per molecule and boiling within a range of about 55 to 130° C. at 1 mm. pressure, said sheet having a capacity of adhering directly to glass under heat and pressure to provide a strong and permanent bond in a temperature range substantially above and below normal atmospheric temperature.

WILLIAM H. LYCAN.